United States Patent
Schwarze

(10) Patent No.: US 7,847,185 B2
(45) Date of Patent: Dec. 7, 2010

(54) LIGHT-WEIGHT PHOTOVOLTAIC SYSTEM

(75) Inventor: Sascha Oliver Schwarze, Berlin (DE)

(73) Assignee: Solon SE, Berlin (DE)

( * ) Notice: Subject to any disclaimer, the term of this patent is extended or adjusted under 35 U.S.C. 154(b) by 355 days.

(21) Appl. No.: 11/901,313

(22) Filed: Sep. 17, 2007

(65) Prior Publication Data

US 2008/0066801 A1 Mar. 20, 2008

(30) Foreign Application Priority Data

Sep. 18, 2006 (DE) .................. 10 2006 044 418

(51) Int. Cl.
*H02N 6/00* (2006.01)
(52) U.S. Cl. .................................. 136/251
(58) Field of Classification Search .............. 136/251; 52/173.3, 586.2, 233.7
See application file for complete search history.

(56) References Cited

U.S. PATENT DOCUMENTS

| | | | |
|---|---|---|---|
| 5,505,788 A | 4/1996 | Dinwoodie | |
| 5,746,839 A | 5/1998 | Dinwoodie | 136/246 |
| 6,148,570 A | 11/2000 | Dinwoodie | 52/173.3 |
| 6,570,084 B2 | 5/2003 | Dinwoodie | 136/251 |
| 6,613,425 B2 * | 9/2003 | LeDuc | 428/316.6 |
| 6,959,517 B2 * | 11/2005 | Poddany et al. | 52/173.3 |
| RE38,988 E | 2/2006 | Dinwoodie | |
| 7,592,537 B1 | 9/2009 | West | |
| 2003/0164187 A1 | 9/2003 | Dinwoodie | 136/251 |
| 2004/0084078 A1 * | 5/2004 | Yoshida et al. | 136/251 |
| 2004/0221524 A1 | 11/2004 | Poddany et al. | |
| 2005/0199278 A1 | 9/2005 | Aschenbrenner | |
| 2006/0272215 A1 * | 12/2006 | Perron | 49/123 |
| 2007/0256381 A1 * | 11/2007 | Foote, Jr. | 52/408 |
| 2008/0041436 A1 * | 2/2008 | Lau et al. | 136/244 |

FOREIGN PATENT DOCUMENTS

| | | |
|---|---|---|
| DE | 100 37 757 A1 | 3/2002 |
| DE | 100 50 624 A1 | 5/2002 |
| DE | 101 02 918 A1 | 7/2002 |
| DE | 202 15 867 U1 | 4/2004 |
| JP | 08288532 A * | 11/1996 |
| JP | 2000220268 A | 8/2000 |
| JP | 2001107518 A | 4/2001 |
| JP | 2001144314 A | 5/2001 |

* cited by examiner

*Primary Examiner*—Kuang Y Lin
*Assistant Examiner*—Steven Ha
(74) *Attorney, Agent, or Firm*—Leydig, Voit & Mayer, Ltd.

(57) ABSTRACT

A light-weight photovoltaic system includes a substructure and a plurality of substantially rectangular photovoltaic modules arranged in a mutually abutting relationship in rows and columns. Each photovoltaic module includes a photovoltaic panel disposed with a predetermined spacing on a self-supporting lightweight board disposed on the substructure. The lightweight board is water pervious and formed from a substantially water repellant material. A frame member is disposed on opposite sides of each photovoltaic panel and includes a recess. A clamping system including a clamping block with an extension at opposite surfaces thereof is provided for insertion into the recesses of the frame members of abutting photovoltaic panels. A tension cable system including a tension cable extends along at least one of the rows and columns. The clamping system and the tension cable system secure an intersection between the rows and columns of the abutting photovoltaic modules.

35 Claims, 2 Drawing Sheets ent invention.

LIGHT-WEIGHT PHOTOVOLTAIC SYSTEM

BACKGROUND OF THE INVENTION

1. Field of the Invention

The invention, in general, relates to a lightweight photovoltaic system consisting of a plurality of photovoltaic modules arranged in rows and columns and, more particularly, to a system of the kind referred to including a plurality of photovoltaic modules consisting of photovoltaic panels disposed over a self-supporting flat and lightweight boards of water-repellant material for mounting at a predetermined distance from a substructure. Preferably, the self-supporting boards of the system engage each other in a gapless arrangement and are held together by guide and connecting fixtures including a frame and a wire tension system.

2. The Prior Art

Among renewable energy sources photovoltaic systems can be applied in many ways not least because of their modular construction from individual photovoltaic modules. Nowadays, their main field of application relates to consumer applications, i.e., they are used to transform solar energy into electric energy. For this purpose, the photovoltaic system has to be mounted on substructures accessible to sun light. As a rule, such substructures are exposed surfaces of roofs or side walls of buildings. In accordance with conventional engineering standards, such as, for instance, the German Industrial Norm (DIN), photovoltaic modules are mounted on flat roofs at an inclination of up to 5°, and they must be capable of withstanding wind load induced forces as specified in DIN 1055-T4 and DIN EN 1991-1, Part 1-4. Suction wind loads have a significant effect upon the dimensions of a photovoltaic system mounted on a flat roof. For instance, in wind load zone II of the Federal Republic of Germany, wind loads are based upon values between 0.82 $kN/m^2$ and 1.02 $kN/m^2$. Thus, any wind load calculations are to be based upon a value of ~1.00 $kN/m^2$. For Europe as a whole higher values must be assumed to apply. For Europe, load values may be assumed in general to correspond to those of German wind load zone III.

In general, the effective suction wind load is safely absorbed and overcome by the weight of the photovoltaic system preventing it from being lifted off. A predetermined safety margin based upon changes in the frictional forces assumed to exist between the substructure, e.g., the cover or surface of the roof, and the gravity system, is also factored in. Accordingly, a force of about 1.00 $kN/m^2$ (Federal Republic of Germany, suction wind loading zone II, height of building >20 m) must be introduced into the roof to prevent the lift off of an unsecured photovoltaic system. This assumed surface load is usually converted into a distributed load and is diverted into the surface of the roof. Therefore, significant point or distributed loads are generated in the area of force transmission between the supports of the photovoltaic system and the cover of the roof cover which can significantly damage the cover as well as the insulation of the roof. During the winter months this load would be increased further by the weight of accumulated snow and ice.

A different problem may result from the photovoltaic systems being usually mounted in a horizontal disposition, forming a wind tunnel between the lower surface of the system and the surface of the substructure which causes additional lifting forces to be introduced into the system. In order to prevent an increase in the overall load of the photovoltaic system, it has, therefore, been found necessary to surround such systems with a wind deflector. Yet another problem arises in connection with inherent load reserves of the substructure which usually is the roof structure. While it may generally be assumed that the structural arrangement of heavy roof structures provides for a load reserve, the supporting framework of light roofs may be assumed to have scarcely any load reserve. Hence, a system depending on gravity cannot be employed on a light roof structure.

Most commercial systems place an emphasis upon weight. The weight is usually absorbed by large support surfaces of stone blocks. Another possibility is to build plastic tubs subsequently filled with ballast such as, for instance, gravel. Yet another system relies upon large surface pedestals placed upon a support surface. As in other systems, the pedestals or feet are weighed down by heavy stone plates, stone blocks or gravel. An alternative would be a lightweight photovoltaic system of the kind provided by the instant invention.

German patent specification DE 101 02 918 A1 discloses photovoltaically effective laminated panels for generating solar electricity and solar heat. The panels are rigidly and adhesively connected to each other and disposed between a support plate and a weatherproof colorless or highly transparent glass plate. German utility model DE 202 15 867 U1 discloses a system for securing photovoltaic modules on point foundations or anchoring points between which wire cables are drawn for connecting a plurality of retaining means. The retaining means are rigidly connected to the photovoltaic modules by support elements attached to the wire cables. U.S. Pat. No. 6,148,570 A discloses a photovoltaic system in which individual photovoltaic modules are connected to each other by I-shaped retaining members which are rigidly connected to the cover of a roof. Surrounding wind deflectors are intended to prevent wind from lifting the system off the roof.

German patent specification DE 100 37 757 A1 discloses a covering element with integrated photovoltaic modules for use as an external cover of a roof or exterior wall of a building. The individual covering elements are rigidly connected to each other by groove and feather connections and pins. German patent specification DE 100 50 624 A1 discloses a light structural panel made of a double wall of textile material and expanded polystyrene (EPS).

U.S. Pat. No. 5,746,839 A to Dinwoodie et al. and assigned to PowerLight Corporation of Berkeley, Calif., USA relates to a lightweight photovoltaic system in which each photo voltaic module consists of a lightweight board of water repellant material with a photovoltaic panel mounted at a predetermined distance. By means of a marginal profile, the lightweight boards are held together in a predetermined arrangement similar to a groove and feather connection. While the entire photovoltaic system is surrounded by a wind deflector structured as a closed frame, the individual photovoltaic modules are without any frame. The shape of the frame system is maintained by a tensioned wire system which also serves to press the individual photovoltaic modules against each other. The tensioned wire system is made up of several tension wires drawn between the rows and columns of the photovoltaic modules and attached to opposite internal surfaces of the frame system. A gap is provided between the lightweight panels and the substructure which may be a flat roof, for instance. The gap serves to equalize the pressure above and below the lightweight photovoltaic system. Together with the wind-deflecting surrounding frame system the photovoltaic system is intended to withstand any occurring suction wind loads without additional safety measures, its lightness notwithstanding.

Evidently the structural measures mentioned were found to be insufficient, for US 2003/0164187 A1, a later application in the name of the assignee's referred to supra and deemed to be the prior art most closely related to the instant invention, discloses a lightweight photovoltaic system differing from the one of the predecessor '839 patent by through-bores in every one of the photovoltaic modules for improved equalization of pressure between the upper and lower surfaces thereof. However, the through-bores reduce the pressure resistance of the lightweight boards. Moreover, flow-conducting radial barriers are arranged in the intermediate space between the photovoltaic panel and the lightweight board. The photovoltaic panels have to be positioned at a relatively large distance from each other so that air may flow between them into the through-bores. However, this reduces the effective photovoltaic surface. Finally, two lightweight boards may at their upper surfaces be connected by additional connecting elements. These relatively complex measures taken in addition to those proposed by U.S. Pat. No. 5,746,839 clearly indicate that securing a lightweight structural system on a substructure without directly engaging it to prevent lift off under suction wind loads is rather problematic indeed.

OBJECTS OF THE INVENTION

It is, therefore, a general object of the invention to provide a lightweight photovoltaic system of improved durability under adverse weather conditions.

A more specific object of the invention resides in providing a photovoltaic system of improved wind stability.

Still another object of the invention is to provide a photovoltaic system of the kind adapted to be mounted on a substantially planar exterior surface of a building.

It is also an object to provide a photovoltaic system suitable for safe mounting on a flat roof, even one of light construction.

Yet another object of the invention is to provide a lightweight photovoltaic system capable of resisting being lifted off under extreme wind conditions.

Another general object of the invention is to provide a photovoltaic system of improved aerodynamic properties.

SUMMARY OF THE INVENTION

In the accomplishment of these and other objects the invention, in a currently preferred embodiment thereof, provides for a plurality of photovoltaic modules arranged in rows and columns made of photovoltaic panels and a self-supporting lightweight planar member arranged on a substructure at a predetermined spacing from the modules, there being provided at opposite sides of each photovoltaic panel two open frame members into which at the lower surface of each photovoltaic panel a clamping system of a predetermined coupling configuration is inserted as a connecting element, each clamping system being attached to and rigidly connecting four photovoltaic panels to form a common point of intersection between them, each module panel formed by the rigid connection of the photovoltaic modules by the clamping system being connected to the substructure by a wire tension system at at least two opposite positions, the module panel directly engaging the substructure without a gap therebetween and the lightweight planar member being a water-pervious structure.

While retaining the known advantages of prior art lightweight systems such as, in particular, ease of mounting, placement even on weak substructures, pressure, weather and fire resistance, the photovoltaic system in accordance with the invention additionally ensures that any suction wind loads of the kind occurring under normal weather conditions are safely and effectively absorbed. Lift off of the inventive photovoltaic system is assuredly prevented by the provision of a common module panel and the anchoring thereof by a simple tension wire system at at least two positions. Furthermore, in the arrangement in accordance with the invention, the structure of the lightweight planar member is such that water collecting on the substructure can run off effectively.

In the inventive photovoltaic system, the safety against lifting off is attained by the rigid connection of all the individual prefabricated photovoltaic modules to form a unitary stable module panel on the substructure. This module panel is then assembled in the manner of a modular matrix from rows and columns of individual photovoltaic modules. The module panel is in turn anchored safely in a simple manner on the substructure at at least two opposite positions. Owing to the sturdy assembly of all photovoltaic modules, the suction wind loads and the anchoring forces are evenly distributed over the entire module panel. Pressure equalization measures involving numerous additional measures or complex anchoring of individual photovoltaic modules and which could damage or deteriorate the substructure at various positions are avoided. In the photovoltaic module in accordance with the invention, the sturdy connection is provided by open frame members precisely placed at opposite sides of the each photovoltaic panel. In a rectangular photovoltaic panel these would be the narrow sides thereof. No frame is needed to surround the entire photovoltaic system as an enclosure and wind deflector requiring complex in situ mounting as an operation in addition to the prefabricating of the individual photovoltaic modules. On the lower surface of each photovoltaic panel the frame members are provided with clamping systems which after placing four photovoltaic modules around a common point of intersection are pushed over the point of intersection and are then arrested. Thus, four photovoltaic modules arranged around a common point of intersection are rigidly connected together. A strong unitary module panel is created by providing a plurality of such clamping systems.

The inherently stable structure in accordance with the invention requires only a few anchoring points for safely mounting it on a substructure. Accordingly, the substructure itself need be modified at a few positions only. In the simplest case only two points of attachment at opposite sides of the module panel are required, although four points of attachments, i.e., one at each side of the photovoltaic system or at its longitudinal sides are preferred. The arrangement of the attachments depends upon the shape of the module panel, conditions relating to the substructure and upon the suction wind loads which can realistically be expected. It should at this point be mentioned that even without attachments the inherent weight of the entire module panel resulting from adding the weight of the individual photovoltaic modules yields reasonable safety against the assembly being lifted off by normal suction wind loads.

In the context of the photovoltaic system in accordance with the invention, when attaching the module panel of a substructure, it is deemed to be especially advantageous to place the module panel on the substructure in immediate engagement therewith. This avoids the need for a gap between the substructure and the lightweight panel member to provide for pressure balancing. To be mounted, the lightweight panel members may be placed directly upon the substructure and pushed against each other. Care must, however, be taken when placing a panel directly upon the substructure to ensure that any water which may collect on the substructure can flow off unimpededly. To this end, while the material of the lightweight planar members in accordance with the invention is actually water-repellent, the panels themselves are pervious to water. They may be of a porous structure as is known from drainage panels. Thus, water running off would flow through the entire lightweight planar members. In principle, the structure should accommodate the volume of water which may collect. Of course, the water-pervious structure must be sufficiently strong not imperil the stability of the self-supporting lightweight planar members and the photovoltaic panel superposed thereon. Similar results may be yielded by appropriately profiling the substructure-engaging lower surface of the lightweight planar member. Such profiling may include a wide range of freely selectable patterns, orientations and cross-sections. For instance, the profiling may be provided by elongated grooves of semicircular, rectangular or preferably truncated cross-section placed at a predetermined distance from, and, if desired, crisscrossing, each other. In such a structure of crisscrossing grooves the points of intersection in the surface of a lightweight planar member would still provide sufficient strength and stability to support the overall weight of the module panel.

The perimeter of the lightweight planar member, hereinafter sometimes referred to as lightweight boards, may be formed or provided with a circumferential insulation. The boards may be cut from larger panels or they may be cast. Alternatively, the lightweight boards may be laminates of at least two panels made, for instance, of polymeric material and interconnected by a spatial lattice work or by a wire-mesh filled with air-filled pockets.

In accordance with a further advantageous embodiment of the invention, the photovoltaic panels are arranged on the substructure in an area unlikely to collect water. In order to provide sufficient structural height, the lightweight board itself may be of an appropriate height. The same applies equally to waterproof photovoltaic panels preferably formed as waterproof laminates. In laminates, the solar cells may be enclosed in a waterproof manner. Nevertheless, the effect of water may damage the laminate or its electrical contacts. Where the photovoltaic panels are structured as laminates, two clamping strips provided at the upper surface of the laminates may advantageously be pressed into the two frame members at the side of each photovoltaic module. In their marginal areas the laminates are protected and elastically retained by profiled or clamping gaskets. The clamping gaskets or strips are screw-mounted free of constraint. Advantageously, the laminates may be provided with biaxial photo cells. Such photo cells are especially efficient since when subjected to impinging light both of their surfaces become photo-active. In order for light to impinge on the lower surface of a biaxial photo cell, it is advantageous to place a reflector at the upper surface of the lightweight board below the photovoltaic panel. The reflector may, for instance, be a film of appropriate reflective properties.

Last but not least the invention may advantageously provide for a clamping system consisting of an upper and a lower clamping block which, in side view, together form a trapezoidal lug. For assembling photovoltaic modules the lug penetrates into a trapezoidal recess in a frame member. Hence, the trapezoidal mounting, together with the groove and feather connection of the individual lightweight boards, constitutes an additional way of interconnecting the frame members of individual photovoltaic modules. Without departing from the ambit of the invention, mountings other than trapezoidal ones may, of course, be used as well. Each clamping block is structured so that together they may be wedged together and thus anchor the individual photovoltaic modules. The two clamping blocks thus form what for the sake of convenience may be termed a "module lock" for the secure, stable, force-transmitting and lasting connection of individual photovoltaic modules. To interconnect individual photovoltaic modules, the upper and lower clamping blocks are placed in superposition and inserted into a trapezoidal groove or rail of frame members of adjacent photovoltaic modules outside of the point of intersection referred to supra. After they have been inserted into a groove or rail, the two clamping blocks may be fastened together by screws so that they would be releasably secured in the frames. Advantageously, the lower clamping block is provided with a bore for receiving a cable of the cable tension system thus providing for additional securing of individual rows of modules.

Other objects and advantages will in part be obvious and will in part appear hereinafter.

DESCRIPTION OF THE SEVERAL DRAWINGS

The novel features which are considered to be characteristic of the invention are set forth with particularity in the appended claims. The invention itself, however, in respect of its structure, construction and layout as well as manufacturing techniques, together with other objects and advantages thereof, will be best understood from the following description of preferred embodiments when read with reference to the appended drawings, in which:

DETAILED DESCRIPTION OF THE PREFERRED EMBODIMENTS

Figure 1:
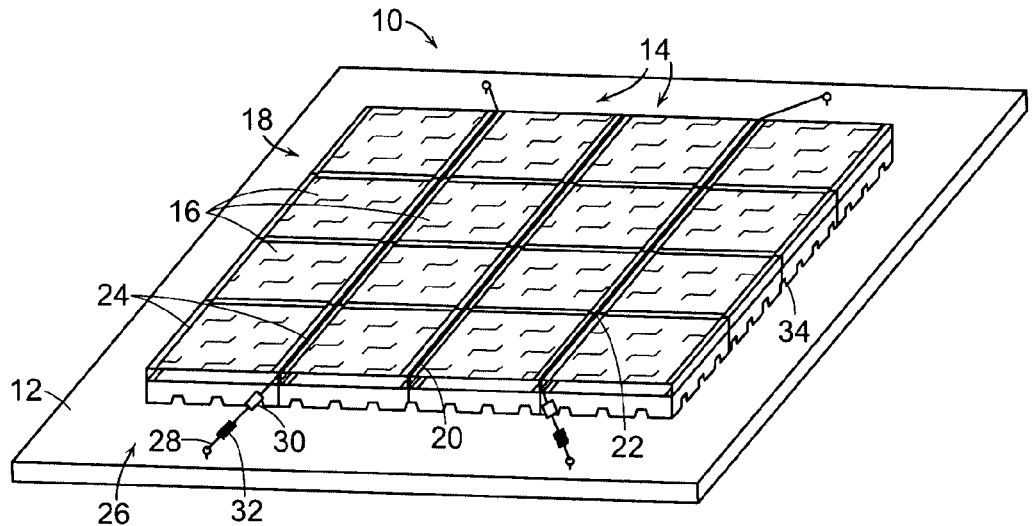
FIG. 1 is a perspective view of the photovoltaic system in accordance with the invention on a substructure.

FIG. 1 depicts a lightweight photovoltaic system 10 placed on a substructure 12 in direct engagement therewith. The schematically depicted substructure 12 may, for instance, be a flat roof of a building (not shown). As shown, the photovoltaic system 10 consists of sixteen substantially rectangular individual photovoltaic modules 14 arranged in horizontal rows and vertical columns and supporting photovoltaic panels 16. By rigidly interconnecting all of the photovoltaic modules 14, a stable rectangular module panel 18 is formed in the manner of a matrix from all the rows and columns of individual photovoltaic modules 14. Any occurring loads and stresses are safely absorbed by and distributed over the matrix. The system 10 is mounted on the substructure 12 in direct engagement therewith. Each photovoltaic module 14 is a prefabricated one and consists of a rectangular photovoltaic panel 16 mounted on a substantially rectangular board 34 to be described. For assembling the module panel 18, the photovoltaic modules 14 are simply placed on the substructure 12 and moved into abutting relationship (in this connection, direct placement on the substructure 12 without any spacers is deemed to be advantageous) and rigidly, i.e., immovably connected to each other. The rigid connection is brought about by a clamping system 20 which extends in an overlapping relationship between the photovoltaic modules 14 such that it is always four adjacent photovoltaic modules 14 which are disposed around a common point of intersection 22 and which are securely held together in a substantially planar arrangement. Gaps or voids in frame members 24 resulting from such overlapping in marginal areas of the module panel 18 are compensated by clamping systems 20 so that the stable connection of the individual photovoltaic modules 14 within the module panel 18 is ensured and extends to marginal areas thereof.

The final operational step of the assembly is to connect the module panel 18 to the substructure 12. As shown in the embodiment of FIG. 1, the module panel 18 is connected to the substructure 12 at only four points by a tension cable system 26. The tension cable 26 engages the frame members 24. It consists of one tension steel cable 28 dimensioned to accommodate the requirements of the static load, a turnbuckle 30 to set the tension and a tension spring 32 which ensures stable tension of the system 26 under changing temperatures conditions.

FIG. 1 also depicts a pattern in lightweight boards 34 in their surface facing and engaging the substructure 12. In the embodiment shown, the pattern consists of a plurality of elongated crisscrossing grooves and serves to divert any water which would otherwise collect from rain or melting ice and snow. The lightweight boards 34 are self-supporting and form the base of each photovoltaic module 14. Further details are shown in the figures described hereinafter.

Figure 2:
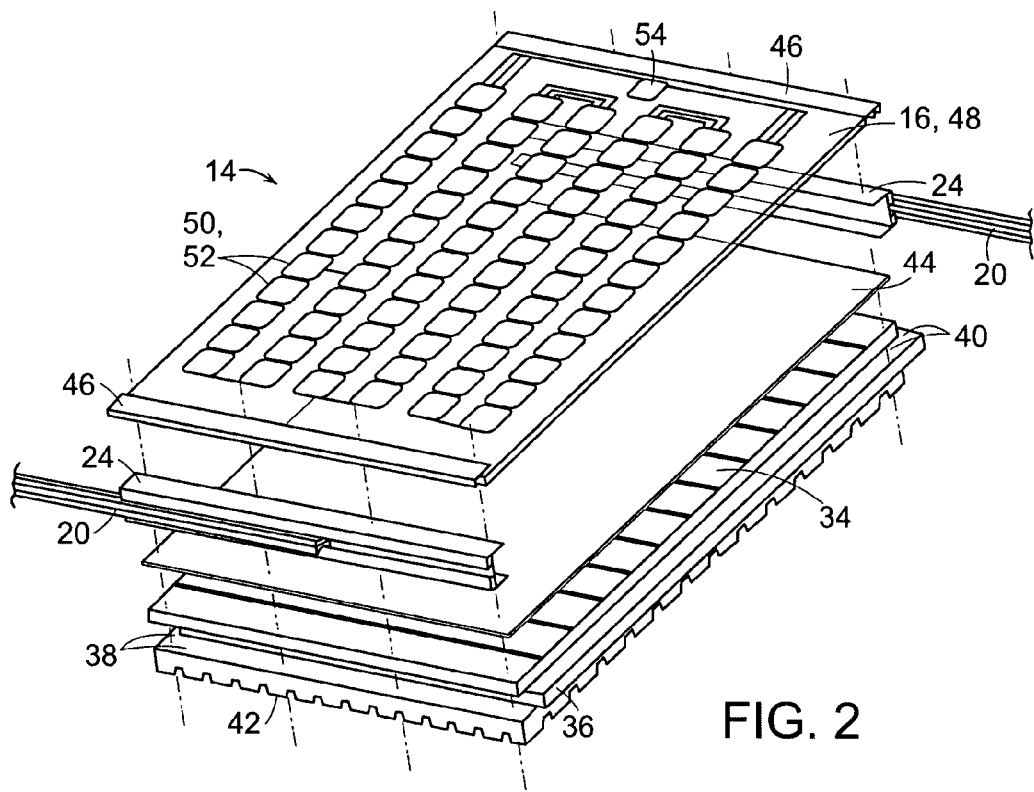
FIG. 2 is an exploded perspective view of the photovoltaic system.

FIG. 2 is an exploded perspective view of a photovoltaic module 14. The lightweight board 34 serves as a self-supporting base of each photovoltaic module 14 and of the module panel 18 as a whole (see FIG. 1). Preferably, the light-weight board 34 consists of a water-repellant material, such as, for instance, expanded polystyrene, also known as EPS, and its shape or configuration is imparted either by the foaming process or by cutting. At its lower surface that is to say the surface placed upon the substructure 12, the lightweight board 34 (hereinafter sometimes referred to as "board") is provided with a pattern designed to allow water to escape, the direct engagement of the board 34 with the substructure 12 notwithstanding (see FIG. 1). The board 34 is provided with a circumferential lip 36 which acts as an alignment element. Two of the four sides of the board 34 are seen to be formed as a groove 38; the other two sides are formed as a feather 40 (only schematically shown in FIG. 2). The groove and feather arrangement facilitates assembly of the module panel 18 at the construction site since it allows exactly to position neighboring boards 34 relative to each other. The longitudinal and transverse dimensions of each lightweight board 34 are a function of technical specifications applicable to a given photovoltaic panel 16. In its longitudinal and transverse directions the lower surface of the board 34 carries a trapezoidally patterned structure 42 to ensure escape of undesirable water from rain or melting snow. The pattern also ensures ventilation between the lower surface of the board 34 and the substructure 12 in general and after periods of rain or snow in particular.

The hard EPS foam board has been officially approved as peripheral insulation material by authorities regulating construction and, in Germany, it has been classified in DIN 4102 as a construction material and in class B1 as to its combustion properties. Its bulk density is stated to be between about 20-30 kg/m$^3$ and thus qualifies as a low density material. The water absorption of the material is stated to be ±0.05% by weight so that it satisfies the requirements for being water proof or water repellent. EPS foam is resistant to vegetable, animal and microbiological pests since it provides no nutrients for them. It also does not rot, collect fungus or decompose. Even if microorganisms were to inhabit the foam material because of significant soiling or other special circumstances, it would merely act as a carrier completely divorced from any biological process. Its compression strength is stated to be 150 KN/m2. Thus, it significantly exceeds the requirement for dynamic stiffness. While exposure to direct sunlight and other sources of ultraviolet radiation causes yellowing of the foam surface, it does not adversely affect the properties of the foam material for construction purposes, and any resulting porosity, because of its insignificant depth, is without consequence. However, even if yellowing and porosity were to amount to a problem it would be no more than a negligible one since only a very small portion of the board 34, to with the narrow surface of its margins, is in fact exposed to UV radiation. The EPS board may be protected by lacquers, sheet metal or other protective coatings. The edges may also be protected by the application of a suitable dressing. Hard EPS foam boards, at conventional bulk densities, contain about 1-5% of polystyrene which is a thermoplastic material. The linear expansion coefficient under the effect of heat is stated to be $7 \cdot 10^{-5}$/K. After an extended exposure to high energy radiation such as, for instance, short-wave UV radiation, X-ray and γ-radiation, the foam matrix is not unlikely to become brittle which would adversely affect the compression and flexibility strengths of the material. However, such deterioration of the material properties may also be considered to be of negligible importance in view of the multiple over-sizing of the boards 34. Furthermore, it is to be noted that the boards 34 are not applied as laminate materials (additional components would be releasably connected by screws rather than adhesives), so that recycling and re-use are possible.

Possible embodiments of the lightweight board 34 will be described hereafter. The board 34 may be formed from a hard EPS foam board approved as peripheral insulation material. Such insulation material is usually cast in large blocks which are subsequently formed to an appropriate shape and size by cutting with a thermal saw. Inherent advantages of the material are its low density, low transport weight and the fact that it is water proof, weather resistant, resistant to changing conditions of the kind induced by freezing and melting, pressure-resistant and that its combustion properties conform to government regulations. An added convenience is that its shape can be altered whenever desired. The many advantages of the material far outweigh any possible disadvantage such as damage to the skin of the foam by subsequent treatments which could bring about structural changes in the material and possible water absorption. Such damage can, however, be easily repaired. The possible darkening of edges exposed to UV-radiation has been referred to supra. Another variant of the hard EPS board provides for its being cast or molded piece-by-piece in a mold specific to this purpose. The particular advantage of such a board resides in the skin of is foam being retained in all of its surfaces without requiring after-treatments.

Of course, the lightweight board may also be fabricated as a laminar structure of at least two plastic boards connected by a lattice structure. While its medium bulk density, which is significantly higher than that of PU foams, is considered to be particularly advantageous, such a complex laminar structure is disadvantageous in the sense that its construction requires a complex and expensive injection mold and the fact that its format cannot readily be altered. Unless the margin of such a structure is sealed, its internal lattice forms a potential channel which may lead to unfavorable wind lifting forces or buoyancy.

The laminate may also be fabricated from a wire mesh filled or interspersed with air-filled blisters resembling ping-pong balls, for instance. With each blister having a diameter ø40 mm and a weight of 2.7 g, a cubic package measuring a cubic decimeter (dm$^3$) would take up 2.5 balls in its length, width and height→2.5×2.5×2.5=~16 balls/dm$^3$→16 balls× 2.7 g=43.2 g/dm$^3$=43.2 kg/m$^3$>PU insulation material or hard EPS insulation boards.

Figure 3:
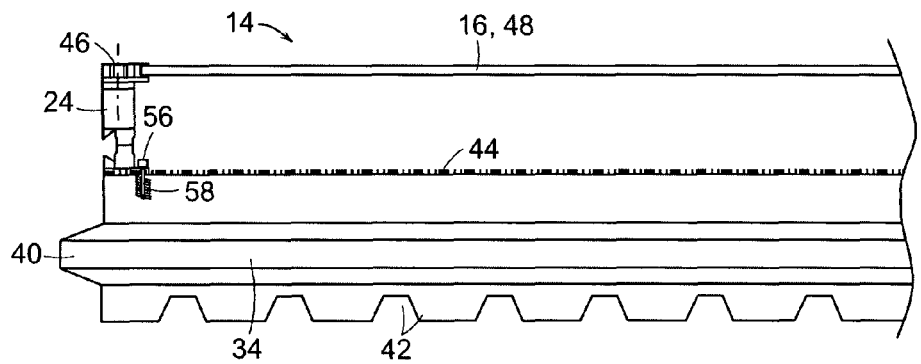
FIG. 3 is a cross-sectional view of one half of a prefabricated photovoltaic module.

In the embodiment shown in FIG. 3, a reflector 44 is deposited on the lightweight board 34. Such a reflector would be used in connection with bifacial solar cells 52 and would expose one face of such a cell to indirect irradiation. A frame member 24 is affixed by screws to each of the shorter sides of the board 34 (see FIG. 4). The frame members 24 (in cooperation with clamping strips 46; see FIG. 4) serve to hold the photovoltaic panels 16 and the clamping system 20 together in a stress-free manner. The cross-section of the frame member 24 is adjusted in accordance with static requirements.

In the embodiment shown in FIG. 2, the photovoltaic panel 16 is structured as a weatherproof laminate 48. The laminate 48 is adjusted in accordance with simulation calculations. The laminate 48 is fabricated in accordance with static requirements from ESG white glass of 4 mm thickness (single pane safety glass) dimensioned 1796 mm×1110 mm. In the embodiment shown in FIG. 2, six rows of twelve solar cells 50 each are deposited on the white glass. Preferably, the solar cells 50 in the depicted embodiment are bifacial and, therefore, capable of converting radiation at both of their surfaces. For this reason, a reflector 44 is placed beneath the photovoltaic panel 16. Instead of bifacial solar cells, the use of single sided solar cells, which would eliminate the need for a reflector, is, of course, possible as well. The spacing between the individual rows of photo cells 50 is about 60 mm. The space between their adjacent margins in the direction of the optically active surface is 30 mm. At the side on which the photovoltaic panel 16 is placed the distance is 140 mm. The photovoltaic panel 16 is provided with an electrical outlet 54 including three diodes (not shown). For their electrical insulation, the solar cells 50 are embedded in an EVA film. Mechanical protection of the rear surface of the laminate 48 is provided by a transparent Tedlar® film.

FIG. 3 is a cross-sectional view of a prefabricated photovoltaic module 14. Typically, a photovoltaic module 14 measures 1850 mm in length, 1100 mm in width and 200 mm in height. The photovoltaic panel 16 can clearly be seen to be a laminate 48. It is disposed over the reflector 44 at a distance of 50 mm. The reflector 44 is connected to the lightweight board 34. The laminate 48 is mounted in the frame member 24 and is secured by a clamping strip 46. At its bottom section the frame member 24 is provided with the clamping system 20 and is threadedly connected to the board 34 by four stainless steel screws 56 (4×50 mm or 4.5×55 mm) which are preferably seated in insulating dowels 58 (four threaded connections for each photovoltaic module 14). The reflector 44 is affixed to the board 34 by the screws 56 as well. The insulating dowels 58 are made of plastic. Since they are protectively positioned under the reflector 44, the insulating dowels 58 are scarcely affected by weather conditions and UV radiation.

The shape of the board 34 and the feather 40 at marginal sections thereof (the corresponding groove 38 is provided at sections of the board 34 which are not shown) are also visible. The height of the board 34 may be 100 mm to 200 mm which would exceed the level of any back water which may be assumed at times to collect in horizontally disposed substructures 12 (see FIG. 1) and would, therefore, maintain the photovoltaic panel 16 in a dry state. This requirement is derived from regulations governing flat roofs. According to these regulations, any water conducting layers must be disposed at least 15 mm above the surface of the roof. The level of any back water is also assumed to be 15 mm.

Figures 4, 5:
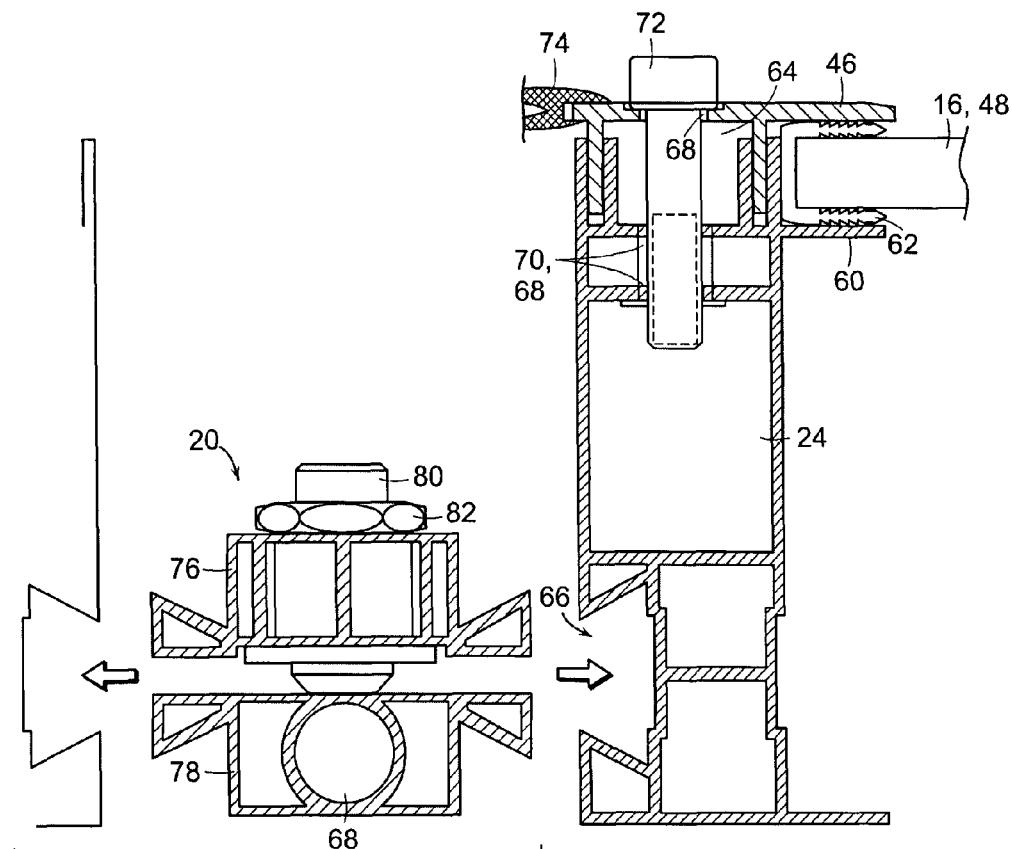
FIG. 4 is a view in detail of the photovoltaic module in the area of the frame members.
FIG. 5 is a detailed view of the frame member in the area of the clamping system.

FIG. 4 depicts a detail of the structure shown in FIG. 3 the area of the frame member 24. At its right side the frame member 24 is provided with a lip 60 for supporting the photovoltaic panel 16 or the laminate 48. At its outer surfaces the margin of the laminate 48 is protected by a substantially U-shaped rubber gasket 62 made of ethylpropyldiene (EPDM) rubber and is held therein in a stress-free manner. The rubber gasket 62 allows the laminate 48 to move in consequence of thermal or static forces and thus prevents fractures. Ethylpropyldiene is being used as standard material as it has been successfully used generally in glass construction. While in keeping with prevailing conditions EPDM is weather and UV radiation resistant, its potential sealing action is of no consequence in connection with the waterproof laminate 48.

The frame member 24 is provided with a first guide groove 64 for receiving a clamping strip 46 and with a second guide groove 66 of trapezoidal cross-section for receiving and guiding the clamping system 20 (see FIG. 5). Depending upon static requirements, the frame member 24, in its first guide groove 64, is also provided with bores 68 for receiving self-threading screws 70 which secure the clamping strip 46. Elongate holes (not shown) are cut into a side surface of the frame member 24 to accommodate electrical cables extending from the outlet 54 in the photovoltaic module 18 to a cable channel (also not shown).

The clamping strip 46 maintains the laminate 48 in the frame member 24 free of stress. The clamping strip 46 is seen to be in engagement with the top of the frame member 24. The clamping strip 46 is preferably made of aluminum. Bores 68 for receiving the screws 72 are also formed in the strip 46 in alignment and conformity with the bores 68 in the frame member 24. A rubber gasket 74 grasps a margin of the clamping strip 46 opposite its margin engaging the panel 16 or laminate 48 to bridge any gap to a next photovoltaic module 14. The gasket 74 also grasps the clamping strip of an adjacent panel 16 or laminate 48 in a mirror-symmetric fashion (not shown).

FIG. 5 discloses a structure which completes the clamping system 20 shown in FIGS. 3 and 4. The clamping system 20 functions between individual photovoltaic modules 14 in a manner of a dovetail connection in order to attain a static panel effect in the common module panel 18. The clamping system 20 consists of an upper clamping block 76 and a lower clamping block 78. Together, the two clamping blocks 76 and 78 securely interlock adjacent photovoltaic modules 14. As shown in FIG. 5, the dovetail connection between two adjacent photovoltaic modules 14 is established by the trapezoidal recess 66 in facing surfaces of frames 24 of adjacent photovoltaic modules 14. The recesses 66 receive substantially triangular (in cross-section) extensions at opposite sides of the upper and lower clamping blocks 76 and 78. The upper clamping block 76 is provided with at least one clamping screw 80 which engages an upper surface of the lower clamping block 80 and serves to move the clamping blocks away from each other and their extensions into a tight and secure engagement with the inclined surfaces of the recesses 66. A locking nut 82 on the screw 80 serves to secure the screw 80 once the extensions have been tightly seated in the recesses 66. The lower clamping block 78 is also provided with a bore 68 for receiving and/or guiding a tension wire to be described. Eye bolts may be placed at the margin of the module panel 18 in front of the bores 68 of the lower clamping block 78 in the photovoltaic panel 16 so that all rows of photovoltaic modules 14 can be connected by one cable. The upper clamping block 76 is provided with enough clamping screws 80 and lock nuts 82 for tensioning the clamping system 20 in accordance with static requirements.

The frame member 24 of the next adjacent photovoltaic module 14 is schematically indicated in FIG. 5. In its assembled state, the lateral extensions of the upper and lower clamping blocks 76 and 78 would penetrate into the trapezoidal recess 66 of the two frame members 24 for securely and positively connecting two adjacent photovoltaic modules 14 once they have been spread apart by the locking screw 80 as described supra. By connecting all the photovoltaic modules 14 in this manner beyond their points of intersection 22, a stable module panel 18 is created as a module matrix with securely connected rows and columns of individual photovoltaic modules 14.

What is claimed is:

1. A light-weight photovoltaic system, comprising:
   a substructure;
   a plurality of substantially rectangular photovoltaic modules arranged in a mutually abutting relationship in rows and columns on the substructure, each photovoltaic module comprising a photovoltaic panel disposed with a predetermined spacing on a self-supporting lightweight board disposed on the substructure, the lightweight board being water pervious and including a substantially water repellant material;
   a frame member disposed on opposite sides of each photovoltaic panel having a first surface with a recess;
   a clamping system including a clamping block having an extension at opposite surfaces thereof and configured for insertion into the recesses of the frame members of abutting photovoltaic panels;
   a tension cable system including a tension cable extending along at least one of the rows and columns,
   wherein the clamping system and the tension cable system secure an intersection between the rows and columns of the abutting photovoltaic modules, and
   wherein the clamping block includes a throughbore and the tension cable is disposed in the throughbore.

2. The photovoltaic system of claim 1, wherein each frame member has a second surface threadedly connected to the lightweight board.

3. The photovoltaic system of claim 2, wherein the frame member, opposite the second surface, is provided with a third surface and a releasable clamping strip for holding the photovoltaic panel therebetween.

4. The photovoltaic system of claim 3, wherein the clamping strip is provided with a first end extending over the photovoltaic panel.

5. The photovoltaic system of claim 4, wherein the clamping strip is provided with a second end extending laterally from the frame member.

6. The photovoltaic system of claim 5, wherein the second end is provided with a gasket adapted to engage a clamping strip of an adjacent photovoltaic panel.

7. The photovoltaic system of claim 1, wherein the clamping system comprises a second clamping block provided with an extension, the clamping blocks being selectively movable relative to each other to move the extensions relative to the recess.

8. The photovoltaic system of claim 1, wherein the tension cable comprises a steel cable.

9. The photovoltaic system of claim 8, wherein the steel cable is provided with a turnbuckle for setting the tension of the cable.

10. The photovoltaic system of claim 8, wherein the steel cable is provided with a tension spring.

11. The photovoltaic system of claim 7, wherein the second clamping block is provided with a throughbore for feeding the tension cable therethrough.

12. The photovoltaic system of claim 1, wherein the lightweight board is provided with at least one channel for preventing the accumulation of liquids on the substructure.

13. The photovoltaic system of claim 1, wherein the lightweight board is formed from a hard material having insulating properties.

14. The photovoltaic system of claim 13, wherein the hard material is expanded polystyrene.

15. The photovoltaic system of claim 1, wherein the lightweight board comprises a laminate of first and second planar members connected by a lattice structure.

16. The photovoltaic system of claim 1, wherein the board comprises a wire mesh with air-filled blisters therein.

17. The photovoltaic system of claim 1, wherein the photovoltaic panels are disposed with the predetermined spacing to the lightweight board at a level outside of a range of weather-induced water.

18. The photovoltaic system of claim 1, wherein the photovoltaic panels are structured as weather-proof laminates.

19. The photovoltaic system of claim 1, wherein at least one photovoltaic panel comprises a plurality of bifacial solar cells and a reflector intermediate the solar cells and the board.

20. The photovoltaic system of claim 1, wherein the tension cable is connected to the substructure at least two points.

21. The photovoltaic system of claim 1, wherein the recess is a trapezoidal recess such that a dovetail connection is formed between the abutting photovoltaic panels.

22. The photovoltaic system of claim 1, wherein the extensions of the clamping block are adapted to spread within the recess.

23. A light-weight photovoltaic system, comprising:
    a substructure;
    a plurality of substantially rectangular photovoltaic modules arranged in a mutually abutting relationship in rows and columns, each photovoltaic module comprising a photovoltaic panel disposed with a predetermined spacing on a self-supporting lightweight board disposed on the substructure, the lightweight board being water pervious and including a substantially water repellant material;
    a frame member disposed on opposite sides of each photovoltaic panel having a first surface with a recess provided with inwardly diverging surfaces;
    a clamping system including a clamping block provided with an extension at opposite surfaces thereof for insertion into the recesses of the frame members of abutting photovoltaic panels and adapted to be spread into engagement with the diverging surfaces thereof;
    elongated means having first and second ends and extending along at least one of the rows and columns for biasing the photovoltaic module against the substructure, the elongated means extending through a throughbore of the clamping block; and
    means mounted on the substructure at opposite sides of the photovoltaic module for connecting the first and seconds ends.

24. The photovoltaic system of claim 23, wherein the clamping system comprises a second clamping block provided with an extension, the clamping blocks being selectively movable relative to each other to move the extensions relative to the recess.

25. The photovoltaic system of claim 23, wherein the lightweight board comprises a laminate of first and second planar members connected by a lattice structure.

26. The photovoltaic system of claim 23, wherein the frame member has a second surface threadedly connected to the lightweight board.

27. The photovoltaic system of claim 23, wherein the elongated means comprises a steel cable.

28. The photovoltaic system of claim 23, wherein the lightweight board is provided with at least one channel for preventing the accumulation of liquids on the substructure.

29. The photovoltaic system of claim 23, wherein the lightweight board is formed from a hard material having insulating properties.

30. The photovoltaic system of claim 29, wherein the hard material is expanded polystyrene.

31. The photovoltaic system of claim 23, wherein the lightweight board comprises a laminate of first and second planar members connected by a lattice structure.

32. The photovoltaic system of claim 23, wherein the board comprises a wire mesh with air-filled blisters therein.

33. The photovoltaic system of claim 23, wherein the photovoltaic panels are disposed with the predetermined spacing to the lightweight board at a level outside of a range of weather-induced water.

34. The photovoltaic system of claim 23, wherein the photovoltaic panels are structured as weather-proof laminates.

35. The photovoltaic system of claim 23, wherein at least one photovoltaic panel comprises a plurality of bifacial solar cells and a reflector intermediate the solar cells and the board.

* * * * *